(No Model.)

W. P. UNDERHILL.
SAFETY REIN.

No. 537,135.  Patented Apr. 9, 1895.

WITNESSES:
George W. Jaisel
O. K. Gast

INVENTOR
William P. Underhill
BY
Gopeek Raegener
ATTORNEYS.

UNITED STATES PATENT OFFICE.

WILLIAM P. UNDERHILL, OF BROOKLYN, NEW YORK, ASSIGNOR OF ONE-HALF TO JOHN L. BURLEIGH, OF SAME PLACE.

SAFETY-REIN.

SPECIFICATION forming part of Letters Patent No. 537,135, dated April 9, 1895.

Application filed January 8, 1895. Serial No. 534,181. (No model.)

*To all whom it may concern:*

Be it known that I, WILLIAM P. UNDERHILL, a citizen of the United States, residing at Brooklyn, in the county of Kings and State of New York, have invented certain new and useful Improvements in Safety-Reins, of which the following is a specification.

My invention relates to safety-reins, and the object of the same is to provide a simple and efficient means for controlling the movements of a horse or other draft-animal, and also prevent it from kicking, and thereby to a certain extent controlling the muscles of the animal.

My invention consists of safety-reins which comprise short main-reins which are attached to the bridle as usual, and are guided across the back of the animal in the usual guide-rings, such short main-rein sections terminating at about the hip line of the animal and being provided with guide-frames which are connected across the back of the animal, and in which are mounted anti-friction rollers over which pass the auxiliary rein-sections or driving lines, which are suitably secured at their lower ends to the opposite portions of the shafts or to the tongue of a vehicle, while the upper ends are grasped by the hands in a manner common to the usual reins.

Figure 1:
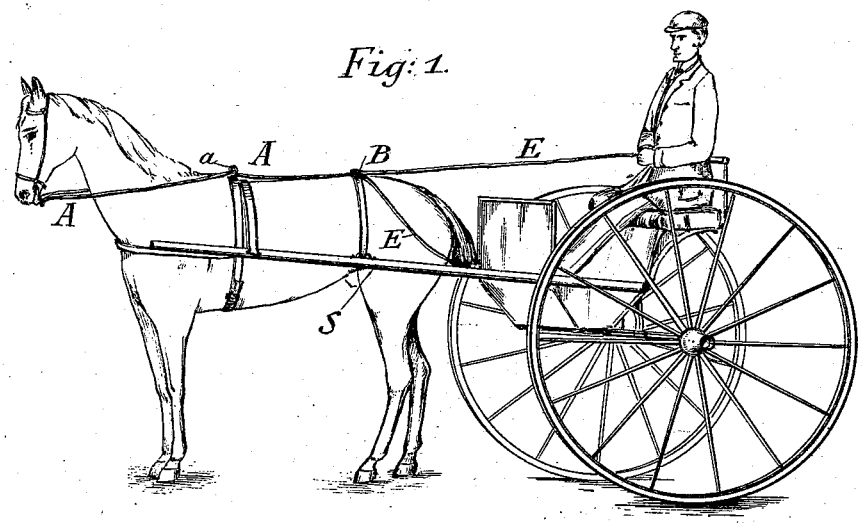
Figure 2:
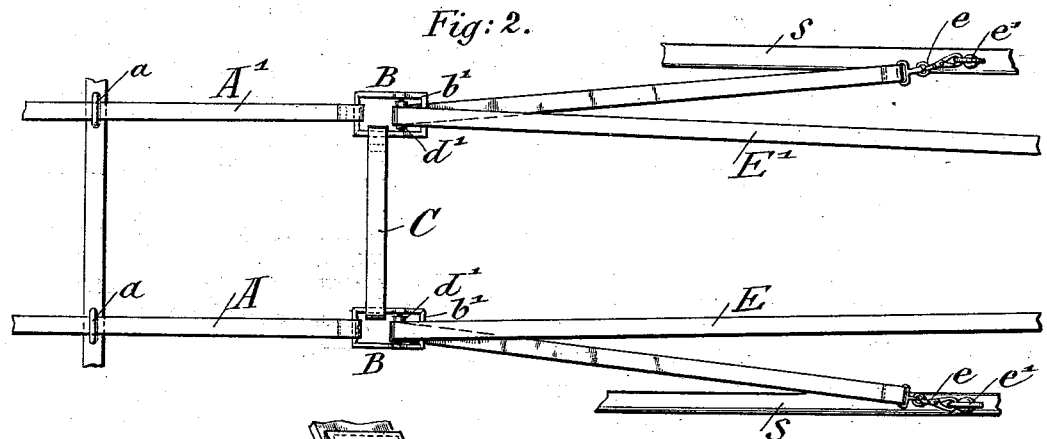
Figure 3:
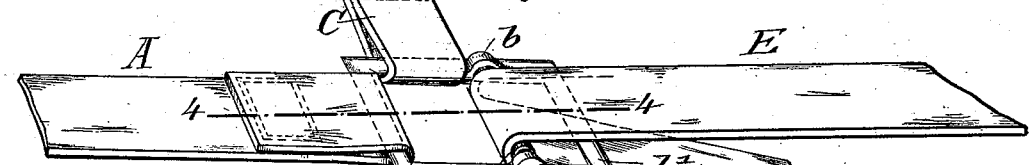
Figure 4:
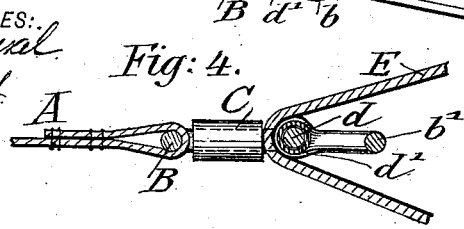

In the accompanying drawings, Figure 1 is a perspective view showing my improved safety-reins in practical use. Fig. 2 is a plan view of my improved safety-reins, the front-ends of the main rein-sections being broken away. Fig. 3 is a detail perspective view of one of the guide-frames, showing the parts of the reins and stay-strap which are attached to or pass through the same, and Fig. 4 is a section on line 4—4, of Fig. 3.

Similar letters of reference indicate corresponding parts.

A, A', indicate the opposite portions of the short main-sections of the safety-reins, which main-sections are attached in the usual manner to the bit and which are guided through suitable guide-rings $a$ attached to the belly-band. The rear-ends of the short main-sections A, A' of the reins terminate at about the hip-joint of the animal, and each section is attached to one of the end-bars of an oblong guide-frame B, which is made of metal cast in one integral piece. The inner contiguous side-bars of the two guide-frames B, B, are connected across the back of the animal by means of a stay-strap C of leather or other suitable material. On the side-bars of each guide-frame is cast integral therewith so as to extend upwardly, a pair of lugs $b$ which are arranged a short distance in advance of the rear end-bar B of the guide-frame, these lugs supporting a cross-rod $d$ on which is mounted an anti-friction roller $d'$. Auxiliary rein-sections E, E', are adapted to pass at about their mid-lengths through the guide-frames lying at opposite sides of the animal and over the anti-friction rollers $d'$, the lower ends of said auxiliary rein-sections being provided with snap-hoops $e$, that are attached to eyes $e'$, supported by the shafts S of any vehicle. The outer ends of the auxiliary rein-sections are taken hold of in the usual manner so as to guide and control the movements of the horse or other draft-animal.

Supposing my improved safety-reins are in practical use as is shown in Fig. 1, and the driver wishes to guide the animal one way or the other, he pulls upon the auxiliary rein-section E or E' according as to whether he is to guide the animal to the right or to the left, or wishes to control his movements in any other usual manner. It will be seen that the reins act in the usual manner, because the auxiliary rein-sections are attached to the shafts and the pulling strain on the sections E, E' acts upon the main rein-sections A, A' through the medium of the guide-frames so that the animal is thereby controlled. Should the animal be inclined to kick, such inclination will be prevented from being carried into practical effect by the driver pulling upon the sections E, E', so that the lower-portions of the same below the guide-frames B will press firmly upon the leg muscles of the animal.

These improved safety-reins can be effectively used in training trotting horses. Should the cross-bars $d$ of the guide-frames break and give way, by reason of some unusual strain, the auxiliary rein-sections E, E', will be brought against the end-bars $b'$ of said guide-frames.

It is evident without further illustration, that my improved safety-reins may with slight modifications be applied to double as well as single teams.

Having thus described my invention, I claim as new and desire to secure by Letters Patent—

1. The safety-reins herein-described, consisting of short main rein-sections connected with the bridle at each side, open guide-frames attached to the rear-ends of said rein-sections, a stay-strap transversely connecting the side-bars of the guide-frames and adapted to pass over the back of the horse, and auxiliary rein-sections guided through said guide-frames, and provided with means at their lower ends for attaching them to the vehicle, while the other ends are grasped by the driver, substantially as set forth.

2. The safety-reins herein-described, consisting of short main rein-sections, guide-frames attached thereto by their forward end-bars, a cross-bar connecting the side-bars of each guide-frame a short distance in advance of the rear-end bar, an anti-friction roller on each cross-bar, a stay-strap transversely connecting the guide-frames and adapted to extend across the back of the horse, and auxiliary rein-sections guided over the anti-friction rollers and provided with means for attaching them at one end to the vehicle, while the other ends are adapted to be grasped by the driver, substantially as set forth.

In testimony that I claim the foregoing as my invention I have signed my name in presence of two subscribing witnesses.

WM. P. UNDERHILL.

Witnesses:
PAUL GOEPEL,
GEORGE W. JAEKEL.